US012651264B1

(12) United States Patent
Verma et al.

(10) Patent No.: US 12,651,264 B1
(45) Date of Patent: Jun. 9, 2026

(54) SYSTEM AND METHOD FOR DETECTING AND PREVENTING POTENTIALLY FRAUDULENT TRANSACTIONS IN REAL TIME USING A LARGE LANGUAGE MODEL

(71) Applicant: Morgan Stanley Services Group Inc., New York, NY (US)

(72) Inventors: Sandeep Verma, Mumbai (IN); Krutika Dhanakshirur, Bengaluru (IN); Swati Nenawat, Bengaluru (IN)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/230,733

(22) Filed: Jun. 6, 2025

(51) Int. Cl.
*G06Q 40/00* (2023.01)
*G06F 16/334* (2025.01)
*G06Q 20/40* (2012.01)

(52) U.S. Cl.
CPC ..... *G06Q 20/4016* (2013.01); *G06F 16/3347* (2019.01)

(58) Field of Classification Search
CPC ........................ G06Q 20/4016; G06F 16/3347
See application file for complete search history.

(56) References Cited

U.S. PATENT DOCUMENTS

| | | | |
|---|---|---|---|
| 9,203,648 B2 | 12/2015 | Shraim et al. | |
| 12,155,685 B1 | 11/2024 | Wali et al. | |
| 12,316,585 B1 * | 5/2025 | Eapen ................ | G06Q 10/0635 |
| 12,335,310 B2 * | 6/2025 | Crabtree ............. | G06F 16/9024 |

| | | | |
|---|---|---|---|
| 2020/0382536 A1 * | 12/2020 | Dherange ........... | H04L 63/1425 |
| 2021/0182859 A1 * | 6/2021 | Srinivasa Rao ....... | G06N 20/00 |
| 2022/0300873 A1 * | 9/2022 | Mahfouz ............... | G06N 3/088 |

(Continued)

FOREIGN PATENT DOCUMENTS

| | | | | |
|---|---|---|---|---|
| CN | 117314638 | * 12/2023 | ............. | G06Q 40/04 |

OTHER PUBLICATIONS

Cao et al., "RiskLabs: Predicting Financial Risk Using Large Language Model-based on Multimodal and Multi-Source Data," arXiv: 1404.07452v2 [q-fin.RM] 2025 (Year: 2025).*

(Continued)

*Primary Examiner* — Abhishek Vyas
*Assistant Examiner* — William B. Bunker
(74) *Attorney, Agent, or Firm* — Leason Ellis LLP

(57) ABSTRACT

A system and method including: obtaining pending transactions; processing weightings for parameters associated with the pending transactions; encoding the pending transactions with the processed weightings into corresponding transaction vector representations; obtaining nearest transactions using the transaction vector representations; determining whether the pending transactions are flagged for association with at least one risky entity; in response to determining that the pending transactions are flagged for association with a risky entity, generating an alert for the nearest transactions; in response to determining that the pending transactions are not flagged, determining whether the nearest transactions are associated with at least one risky entity; in response to determining that the pending transactions or the nearest transactions are flagged for association with at least one risky entity, generating an alert for the pending transactions; and output the generated alerts to one or more computing devices via a network interface.

16 Claims, 4 Drawing Sheets

(56)            References Cited

U.S. PATENT DOCUMENTS

| 2023/0135659 A1* | 5/2023 | Wu | G06N 3/044 |
| | | | 706/21 |
| 2024/0152926 A1 | 5/2024 | Musunuru et al. | |
| 2025/0184340 A1* | 6/2025 | Wali | H04L 67/10 |
| 2025/0211615 A1* | 6/2025 | Cernat | G06F 40/40 |

OTHER PUBLICATIONS

Nourbakhsh et al., "A framework for anomaly detection using language modeling and its applications to finance," arXiv: 1908.09156v1 [cs.CL] 2019 (Year: 2019).*

Feuerriegel et al., "Long-term stock index forecasting based on text mining of regulatory disclosures," arXiv. 1806.09866v1 [stat. AP] Jun. 2018 (Year: 2018).*

Adusumilli et al., "Leveraging Large Language Models and Deep Learning for Detecting Illegal Insider Trading," IEEE International Conference on Big Data, 2024 (Year: 2024).*

Sharkey et al., "Comparison of BERT and GPT," ARXIV ID. 2405.12990 2024 (Year: 2024).*

* cited by examiner

100

300

SYSTEM AND METHOD FOR DETECTING AND PREVENTING POTENTIALLY FRAUDULENT TRANSACTIONS IN REAL TIME USING A LARGE LANGUAGE MODEL

FIELD

The present disclosure generally relates to a computer-implemented system and method for fraud prevention and, more specifically, to a system and method for detecting and preventing potentially fraudulent transactions in real time using a large language model (LLM).

BACKGROUND

Fraud remains a prominent issue for financial institutions that handle large volumes of transactions. For large institutions with voluminous transactions across multiple jurisdictions, fields of operation, and corresponding entities, there is a need to respond quickly and in timely manner to external events that may implicate potential and ongoing transactions. For example, catastrophic events, such as collapse of banks, sanctioning of countries and financial entities, or the like, can have profound effects on potential transactions, for example, those related to or involve such banks, countries, entities, etc. In fast moving areas, institutions that handle large volumes of transactions can be susceptible to significant financial and reputational losses when transactions are allowed to proceed despite such catastrophic events. Failure to prevent such transactions may also lead to catastrophic legal consequences for the institution. Additionally, bad actors can exploit such institutions that do not adequately react to changing circumstances of a transaction.

SUMMARY

In view of the above challenges, there is a need for a technological solution to address the shortcomings of existing transaction processing and management systems that do not adequately safeguard against changing circumstances related to the transactions.

To address this need, the present disclosure provides a computer-implemented system and method that processes news items, for example, about an eminent collapse of a bank, and provides a real time cache of risky entities, such as the bank, for flagging and blocking potential transactions involving or related to such risky entities. The present disclosure provides a technique for automatically and accurately blocking transactions in real time and at scale. The present disclosure further provides a technique for verifying additional similar transactions based on a detected risky entity.

According to one or more exemplary implementations of the present disclosure, a system, comprises: a network interface; a processor; and a memory operatively connected to the processor and having stored thereon machine-readable instructions that, when executed, cause the processor to: obtain, from a transaction processing management system via the network interface, one or more pending transactions; process, using a first artificial intelligence (AI) processor, weightings for one or more parameters associated with the one or more pending transactions obtained from the transaction processing management system; encode, using a second AI processor, the one or more pending transactions with the processed weightings into corresponding one or more transaction vector representations; obtain, from one or more first databases, one or more nearest transactions using the one or more transaction vector representations; determine whether the one or more pending transactions obtained from the transaction processing management system are flagged for association with at least one risky entity; in response to determining that the one or more pending transactions obtained from the transaction processing management system are flagged for association with at least one risky entity, generate an alert for the one or more nearest transactions obtained from the one or more databases; in response to determining that the one or more pending transactions obtained from the transaction processing management system are not flagged for association with at least one risky entity, determine whether the one or more nearest transactions obtained from the one or more databases are associated with at least one risky entity; in response to determining that the one or more pending transactions obtained from the transaction processing management system or the one or more nearest transactions obtained from the one or more databases are flagged for association with at least one risky entity, generate an alert for the one or more pending transactions obtained from the transaction processing management system; and output the generated one or more alerts to one or more computing devices via the network interface.

In one or more exemplary implementations, the memory has stored thereon additional machine-readable instructions that, when executed, cause the processor to: obtain, from one or more servers via the network interface, one or more news items; encode, using a third AI processor, the one or more news items obtained from the one or more servers into corresponding one or more news item vector representations; obtain, from one or more second databases, one or more nearest news items using the one or more news item vector representations; query, via the network interface, a fourth AI processor for an identification of one or more risky entities using the one or more news items obtained from the one or more servers and the one or more nearest news items obtained from the one or more second databases; determine whether a response from the fourth AI processor comprises at least one risky entity; and in response to determining that the response from the fourth AI processor comprises at least one risky entity, update a real time cache with the at least one risky entity.

In one or more exemplary implementations, the memory has stored thereon additional machine-readable instructions that, when executed, cause the processor to: obtain, via the network interface, a plurality of transactions from the transaction processing management system; determine, using the real time cache, whether the plurality of transactions contains one or more parameters associated with at least one risky entity; and in response to determining that at least one of the plurality of transactions contains at least one parameter associated with at least one risky entity, issue a fraud alert response at the transaction processing management system for flagging the at least one transaction for association with the at least one risky entity.

In one or more exemplary implementations, the determining of whether the plurality of transactions contains one or more parameters associated with at least one risky entity is executed for the one or more pending transactions prior to the obtaining of the one or more pending transactions from the transaction processing management system.

In one or more exemplary implementations, the third AI processor is an encoder based AI processor and the fourth AI processor is a decoder based AI processor.

In one or more exemplary implementations, the one or more second databases comprise at least one vector database (DB) having stored therein news items in text chunks annotated with identified risky entities, and the one or more nearest news items are obtained from the one or more second databases using an approximate nearest neighbor (ANN) search using the one or more news item vector representations.

In one or more exemplary implementations, the weightings are processed based on fraud trends over a period prior to the processing of the weightings.

In one or more exemplary implementations, the first AI processor is a transformer and the second AI processor is an encoder based AI processor.

In one or more exemplary implementations, the one or more first databases comprise at least one vector database (DB) having stored therein transactions with annotations in connection with risky entities.

In one or more exemplary implementations, the one or more nearest transactions are obtained from the one or more first databases using an approximate nearest neighbor (ANN) search using the one or more transaction vector representations.

According to one or more exemplary implementations of the present disclosure, a method, comprises: obtaining, at a computing apparatus from a transaction processing management system via a network interface, one or more pending transactions; processing, using a first artificial intelligence (AI) processor, weightings for one or more parameters associated with the one or more pending transactions obtained from the transaction processing management system; encoding, using a second AI processor, the one or more pending transactions with the processed weightings into corresponding one or more transaction vector representations; obtaining, from one or more first databases, one or more nearest transactions using the one or more transaction vector representations; determining whether the one or more pending transactions obtained from the transaction processing management system are flagged for association with at least one risky entity; in response to determining that the one or more pending transactions obtained from the transaction processing management system are flagged for association with at least one risky entity, generating an alert for the one or more nearest transactions obtained from the one or more databases; in response to determining that the one or more pending transactions obtained from the transaction processing management system are not flagged for association with at least one risky entity, determining whether the one or more nearest transactions obtained from the one or more databases are associated with at least one risky entity; in response to determining that the one or more pending transactions obtained from the transaction processing management system or the one or more nearest transactions obtained from the one or more databases are flagged for association with at least one risky entity, generating an alert for the one or more pending transactions obtained from the transaction processing management system; and outputting the generated one or more alerts to one or more computing devices via the network interface.

In one or more exemplary implementations, the method further comprises: obtaining, from one or more servers via the network interface, one or more news items; encoding, using a third AI processor, the one or more news items obtained from the one or more servers into corresponding one or more news item vector representations; obtaining, from one or more second databases, one or more nearest news items using the one or more news item vector representations; querying, via the network interface, a fourth AI processor for an identification of one or more risky entities using the one or more news items obtained from the one or more servers and the one or more nearest news items obtained from the one or more second databases; determining whether a response from the fourth AI processor comprises at least one risky entity; and in response to determining that the response from the fourth AI processor comprises at least one risky entity, updating a real time cache with the at least one risky entity.

In one or more exemplary implementations, the method further comprises: obtaining, via the network interface, a plurality of transactions from the transaction processing management system; determining, using the real time cache, whether the plurality of transactions contains one or more parameters associated with at least one risky entity; and in response to determining that at least one of the plurality of transactions contains at least one parameter associated with at least one risky entity, issuing a fraud alert response at the transaction processing management system for flagging the at least one transaction for association with the at least one risky entity.

In one or more exemplary implementations, the determining of whether the plurality of transactions contains one or more parameters associated with at least one risky entity is executed for the one or more pending transactions prior to the obtaining of the one or more pending transactions from the transaction processing management system.

In one or more exemplary implementations, the third AI processor is an encoder based AI processor and the fourth AI processor is a decoder based AI processor.

In one or more exemplary implementations, the one or more second databases comprise at least one vector database (DB) having stored therein news items in text chunks annotated with identified risky entities.

In one or more exemplary implementations, the one or more nearest news items are obtained from the one or more second databases using an approximate nearest neighbor (ANN) search based on the one or more news item vector representations.

In one or more exemplary implementations, the first AI processor is a transformer and the second AI processor is an encoder based AI processor.

In one or more exemplary implementations, the one or more first databases comprise at least one vector database (DB) having stored therein transactions with annotations in connection with risky entities.

In one or more exemplary implementations, the one or more nearest transactions are obtained from the one or more first databases using an approximate nearest neighbor (ANN) search based on the one or more transaction vector representations.

BRIEF DESCRIPTION OF THE DRAWINGS

Various example implementations of this disclosure will be described in detail, with reference to the following figures, wherein.

DETAILED DESCRIPTION

As an overview, the present disclosure generally concerns transaction processing and management systems and provides a technique for maintaining a real time cache, or repository, of identified risky entities based upon which transactions can be flagged for review and/or blocking. The present disclosure also provides a technique for verifying similar transactions based upon one or more transactions identified via a risky entity. A risky entity can be an individual, a group, an organization, a corporation, an institution, a jurisdiction, a country, to name a few, that is identified as being exposed to a heightened level of risk based upon one or more events indicated in one or more news items.

The following example implementations are described based on financial transaction features of which may be incorporated into other types of transactional operations without departing from the spirit and the scope of the disclosure.

Figure 1:
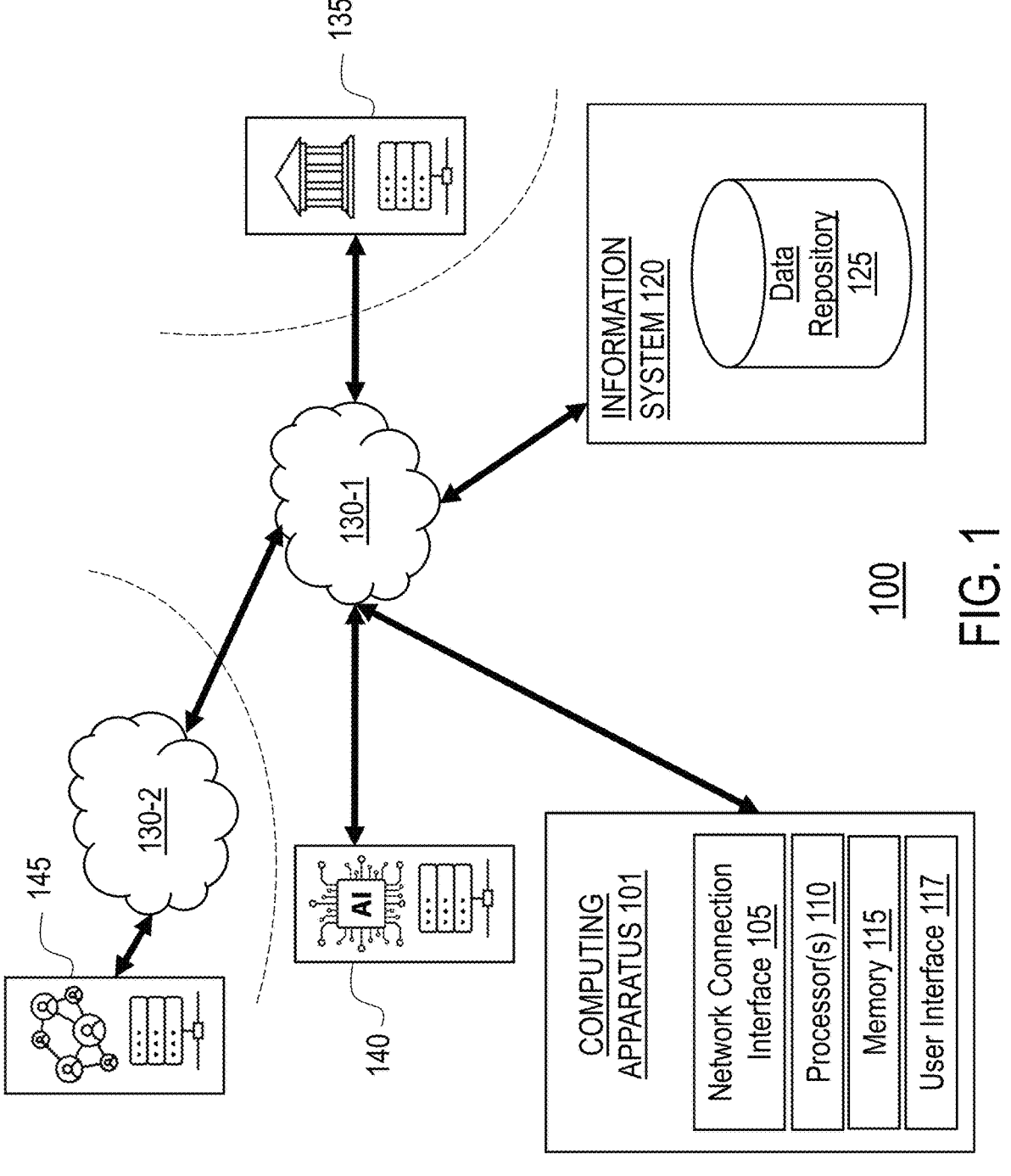
FIG. 1 is a schematic diagram of a system for identifying one or more risky entities associated with corresponding one or more transactions according to one or more exemplary implementations of the present disclosure.

FIG. 1 is a schematic diagram of a system 100 for identifying one or more risky entities associated with corresponding one or more transactions according to one or more exemplary implementations of the present disclosure.

As illustrated in FIG. 1, system 100 comprises at least one computing apparatus 101 that incorporates a network interface connection 105, one or more processors 110, a memory 115, and a user interface 117. Computing apparatus 101 is communicatively coupled to at least one information system 120, via a network 130-1. As illustrated in FIG. 1, information system 120 incorporates at least one data repository 125.

Computing apparatus 101 and information system 120 are communicatively coupled to a transaction processing management system 135 via network 130-1. As illustrated in FIG. 1, computing apparatus 101, information system 120, and transaction processing management system 135 form at least a part of an enterprise computing network with network 130-1 according to one or more exemplary implementations of the present disclosure. The enterprise network, including network 130-1, can be associated with any enterprise, organization, or institution. Computing apparatus 101 and/or information system 120 form at least a part of a fraud detection system, or platform, for monitoring potential transactions that are processed and managed at system 135. In certain embodiments, the functionality of computing apparatus 101 and/or information system 120 can be incorporated in either of these elements as a standalone system or can be incorporated in additional apparatuses, for example, conforming to the configurations of computing apparatus 101 and/or information system 120, that are in communication with network 130-1.

Computing apparatus 101 and/or information system 120 are also communicatively coupled to an artificial intelligence (AI) processing system 140 adapted to provide responses to fraud identification queries. In one or more exemplary implementations, AI processing system 140 comprises at least one or more encoder modules, for example, with Bidirectional Encoder Representations from Transformers (BERT), one or more decoder modules, for example, with Generative Pre-trained Transformers (GPT) for a large language model (LLM), and one or more transformers. AI processing system 140 can comprise one or more server apparatuses, computers, or the like, conforming to the configurations of computing apparatus 101 and/or information system 120 for procuring one or more AI processing models, including at least one or more decoder based AI processors, such as a LLM corresponding to the risky entity identification process steps described in further detail below, one or more encoder based AI processors, such as a BERT, corresponding to the risky entity identification process steps and the similar transaction screening process steps described in further detail below, and one or more transformers corresponding to the similar transaction screening process steps described in further detail below. In certain embodiments, AI processing system 140 can be integrated with one or more of computing apparatus 101 and information system 120. In certain embodiments, the LLM for the identification process steps, the BERT for the identification process steps and/or the similar transaction screening process steps, and the transformer for the similar transaction screening process steps can be maintained at discrete AI processing systems 140. In some embodiments, one or more of such systems 140 can be external to network 130-1, for example, in communication with computer apparatus 101 and/or information system 120 via external network 130-2. Thus, at least a portion of AI processing system 140 can be part of an external AI processing service, for example, that is maintained at one or more servers (not shown) external to the enterprise network formed by computing apparatus 101, information system 120, network 130-1, and transaction processing management system 135.

For obtaining real time information on potential risky entities corresponding to the risky entity identification process steps described in further detail below, computing apparatus 101 and/or information system 120 are in communication, via network 130-2, with at least one news information service and/or social media platform, which is maintained at an external (e.g., a news information and/or social media platform) server 145. In certain embodiments, an organization, institution, or enterprise can incorporate one or more internal news information sources (not shown) within the enterprise network 130-1 for providing updated new items to computing apparatus 101 and/or information system 120. Such one or more internal news information source(s) can be procured using one or more apparatuses conforming to the configurations of computing apparatus 101 and/or information system 120.

Networks 130 can comprise the Internet, an intranet network, a local area network, other wireless or other hardwired connection or connections, or a combination of one or more thereof, by which the aforementioned entities can communicate. Communications systems for facilitating network 130 can include hardware (e.g., hardware for wired and/or wireless connections) and/or software, and the communications interface hardware and/or software, which can be used to communicate over wired and/or wireless connections, can include Ethernet interfaces (e.g., supporting a TCP/IP stack), X.25 interfaces, T1 interfaces, and/or antennas, to name a few. Computer systems can communicate with other computer systems or devices directly and/or indirectly, e.g., through a data network, such as the Internet, a telephone network, a mobile broadband network (such as a cellular data network), a mesh network, Wi-Fi, WAP, LAN, and/or WAN, to name a few. For example, network(s) 130 can be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), which are some of the various types of protocols that can be used to facilitate communications among computing apparatus 101, information system 120, transaction processing management system 135, AI processing system 140, and news information server 145. According to one or more exemplary embodiments of the present disclosure, network 130-1 is comprised of switches (not shown), routers (not shown), and other computing devices (not shown) for facilitating communications and data exchanges among computing apparatus 101, information system 120, transaction processing management system 135, AI processing system 140, network 130-2, and news information server 145, while conforming to the above-described connections and protocols as understood by those of ordinary skill in the art.

Computing apparatus 101 can be a server apparatus, desktop computer, or the like. Network connection interface 105 can use any of the previously mentioned exemplary communications protocols. According to one or more exemplary implementations, network connection interface 105 comprises one or more universal serial bus ("USB") ports, one or more Ethernet or broadband ports, and/or any other type of hardwire access port to communicate with networks 130 and, accordingly, information system 120, transaction processing management system 135, AI processing system 140, and news information server 145.

Processor(s) 110 can include any suitable processing circuitry capable of controlling operations and functionality of computing apparatus 101, as well as facilitating communications between various components within computing apparatus 101. In some embodiments, processor(s) 110 can include a central processing unit ("CPU"), a graphic processing unit ("GPU"), one or more microprocessors, a digital signal processor, or any other type of processor, or any combination thereof. In some embodiments, the functionality of processor(s) 110 can be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 110 can include its own local memory, which can store program systems, program data, and/or one or more operating systems.

Memory 115 can include one or more types of storage mediums, such as any volatile or non-volatile memory, or any removable or non-removable memory implemented in any suitable manner to store data for computing apparatus 101. For example, information can be stored using computer-readable instructions, data structures, and/or program systems. Various types of storage/memory can include, but are not limited to, hard drives, solid state drives, flash memory, permanent memory (e.g., ROM), electronically erasable programmable read-only memory ("EEPROM"), CD ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, memory 115 can be implemented as computer-readable storage media ("CRSM"), which can be any available physical media accessible by processor(s) 110 to execute one or more instructions stored within memory 115. According to one or more exemplary implementations, one or more applications corresponding to the risky entity identification process steps, transaction flagging process steps, and similar transaction screening process steps described in further detail below are stored in memory 115 and executed by processor(s) 110.

As described above, information system 120 incorporates one or more data repositories 125, which embody servers and corresponding storage media for storing data for enterprise network 130-1 as will be understood by one of ordinary skill in the art. Exemplary storage media for data repository 125 correspond to those described above with respect to memory 115, which will not be repeated here. According to one or more exemplary implementations, information system 120 incorporates one or more databases in data repository 125, which incorporate a relational database management system (RDBMS) that employs the Structured Query Language (SQL) standard as its command-and-control language. In certain embodiments, information system 120 can be comprised of one or more database servers that support Oracle SQL, NoSQL, NewSQL, PostgreSQL, MySQL, Microsoft SQL Server, Sybase ASE, SAP HANA, DB2, and the like. Information system 120 incorporates a network connection interface (not shown) for communications with network 130-1 and exemplary implements of which can include those described above with respect to network connection interface 105, which will not be repeated here.

Transaction processing management system 135 incorporates one or more server apparatuses, computers, or the like, conforming to the configurations of computing apparatus 101 and/or information system 120 for processing and managing transactions of enterprise network 130-1, which can include payment processing, fund transfers, currency exchanges, investment transactions, loans, banking transactions, wire transfers, checks, Automated Clearing House (ACH) transfers, peer to peer payments, to name a few.

Figure 2:
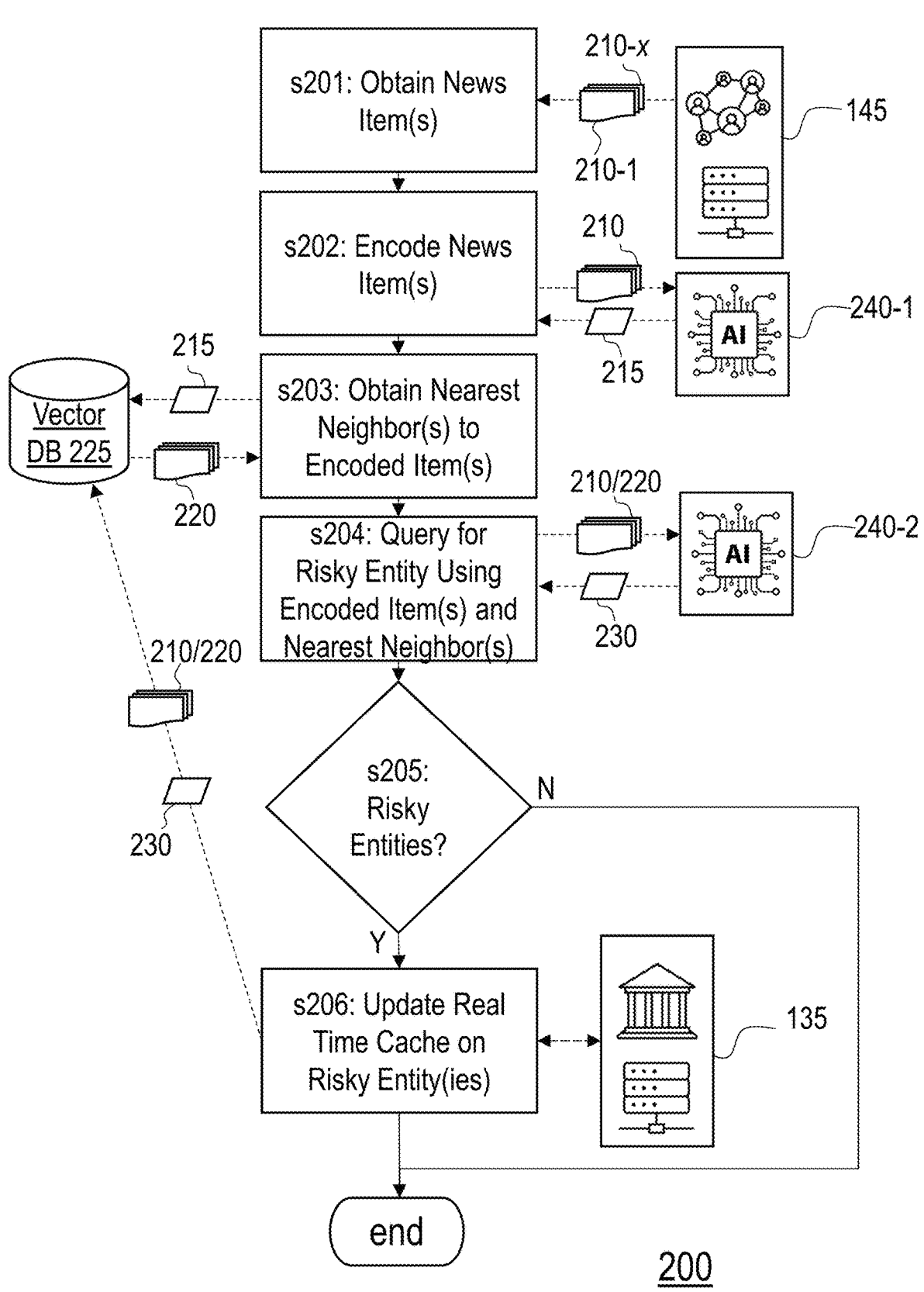
FIG. 2 is a flow diagram of a risky entity identification process for the system of FIG. 1 in accordance with one or more exemplary implementations of the present disclosure.

FIG. 2 is a flow diagram of a risky entity identification process 200 in accordance with one or more exemplary implementations of the present disclosure.

As illustrated in FIG. 2, process 200 initiates with step s201, where computing apparatus 101 (and/or information system 120) obtains one or more news items 210-1 ... 210-x (x≥1) from news information server 145. Each new item 210 can be a news article, a press release, a social media message, or the like. In one or more exemplary implementations, process 200 is executed at computing apparatus 101 (and/or information system 120) on a recurrent, or iterative, basis using, for example, an application programming interface (API) to access server 145 for obtaining (or retrieving) the latest news item(s) 210 and for updating a real time cache, or repository, (not shown) with any risky entities identifiable from the obtained new item(s) 210. In one or more exemplary embodiments, process 200 is executed on a periodic loop, for example, every 5 minutes, or the like. In embodiments, the execution timing of process 200 is configurable and can be changed based on prevailing external situations like geopolitical events. In certain embodiments, server 145 can include one or more real time news feeds from one or more trusted news sources, for example, Bloomberg or the like, or from one or more social media platforms, for example, Twitter or the like. The one or more real time new feeds can be subscribed in association with computing apparatus 101 (and/or information system 120). Step s201 and process 200 can be triggered by a notification from server 145, such as from a subscribed feed, or the like—for example, through a Representational State Transfer (REST) service, a Kafka (event streaming platform) event, or the like.

In some embodiments, news item(s) 210 can be embodied in corresponding one or more notifications pushed from server 145.

Next, at step s202, computing apparatus 101 (and/or information system 120) encodes the obtained news item(s) 210 into respective one or more vector representations 215 using an encoder based AI processor 240-1 of AI processing system 140. In one or more exemplary implementations, each element or article in the obtained news item(s) 210 is chunked into chunked portions to create one or more vectors using encoder based AI processor 240-1. In certain embodiments, encoder based AI processor 240-1 can incorporate an encoder only model, such as BERT or the like, for capturing meaning of the chunked text.

At step s203, computing apparatus 101 (and/or information system 120) obtains one or more nearest neighbor news items 220 from a database 225 maintained at computing apparatus 101 (and/or information system 120). In one or more exemplary implementations, database 225 is a vector database (DB) having stored therein news items in text chunks annotated with identified risky entities, for example, by manual annotation, prior processing and/or training using models 240, prior executions of process 200, and/or annotation based on the similar transaction screening process steps described in further detail below. In certain embodiments, the vector DB 225 can provide an approximate nearest neighbor (ANN) search for obtaining nearest neighbor news item(s) 220. Advantageously, vector DB 225 incorporating a store of text chucks annotated with risky entities is useful for providing retrieval augmented generation (RAG) in connection with identifying risky entities from newly obtained news items 210.

With the news item(s) 210 obtained from server 145 and the nearest annotated news item(s) 220 obtained from vector DB 225, computing apparatus 101 (and/or information system 120), at step s204, queries a decoder based AI processor 240-2 of AI processing system 140 for an identification of one or more risky entities suggested from items 210 and 220. In one or more exemplary implementations, computing apparatus 101 (and/or information system 120) provides items 210 and 220, along with one or more prompts to identify any risky entities, via an API to AI processor 240-2. In certain embodiments, decoder based AI processor 240-2 can incorporate a decoder only model, such as a GPT or the like. Computing apparatus 101 (and/or information system 120) obtains a message 230 from AI-processor 240-2 in response.

Next, at step s205, computing apparatus 101 (and/or information system 120) determines whether a response message 230 from AI processor 240-2 identifies one or more risky entities.

Upon determining that response 230 identifies one or more risky entities ("Y"), computing apparatus 101 (and/or information system 120) proceeds to step s206 and updates a real time cache, or repository, (not shown) with the identified one or more risky entities. In one or more exemplary embodiments, the real time cache (not shown) is maintained at one or more of computing apparatus 101, information system 120, and transaction processing management system 135 and is referenced by transaction processing management system 135 for validating and executing transactions. In certain embodiments, the real time cache (not shown) provides for auditing newly generated or ongoing potential transactions that are awaiting execution based on identified risky entities. Advantageously, transaction processing management system 135 is provided with a capability of blocking potentially loss inducing transactions based on risky entities identified in real time from analyzing the new item(s) 220 and maintained at the real time cache, which is accessible to transaction processing management system 135.

In one or more exemplary implementations, computing apparatus 101 (and/or information system 120) also, at step s206, updates vector DB 225 based on the risky entity(ies) identified in response message 230, the associated news item(s) 210 obtained from server 145, and the nearest neighbor new item(s) 220 obtained based on the news item(s) 210. In certain embodiments, vector DB 225 can be updated by annotating one or more associations among chunks from the news item(s) 210 encoded at step s202 and the news item(s) 220 obtained at step s203 with the risky entity(ies) noted in the response message 230 obtained at step s204. Accordingly, vector DB 225 is maintained as an up-to-date repository for nearest neighbor news items that can suggest one or more risky entities to AI processor 240-2.

Upon determining that response 230 does not identify any risky entities ("N"), computing apparatus 101 (and/or information system 120) concludes process 200.

Figure 3:
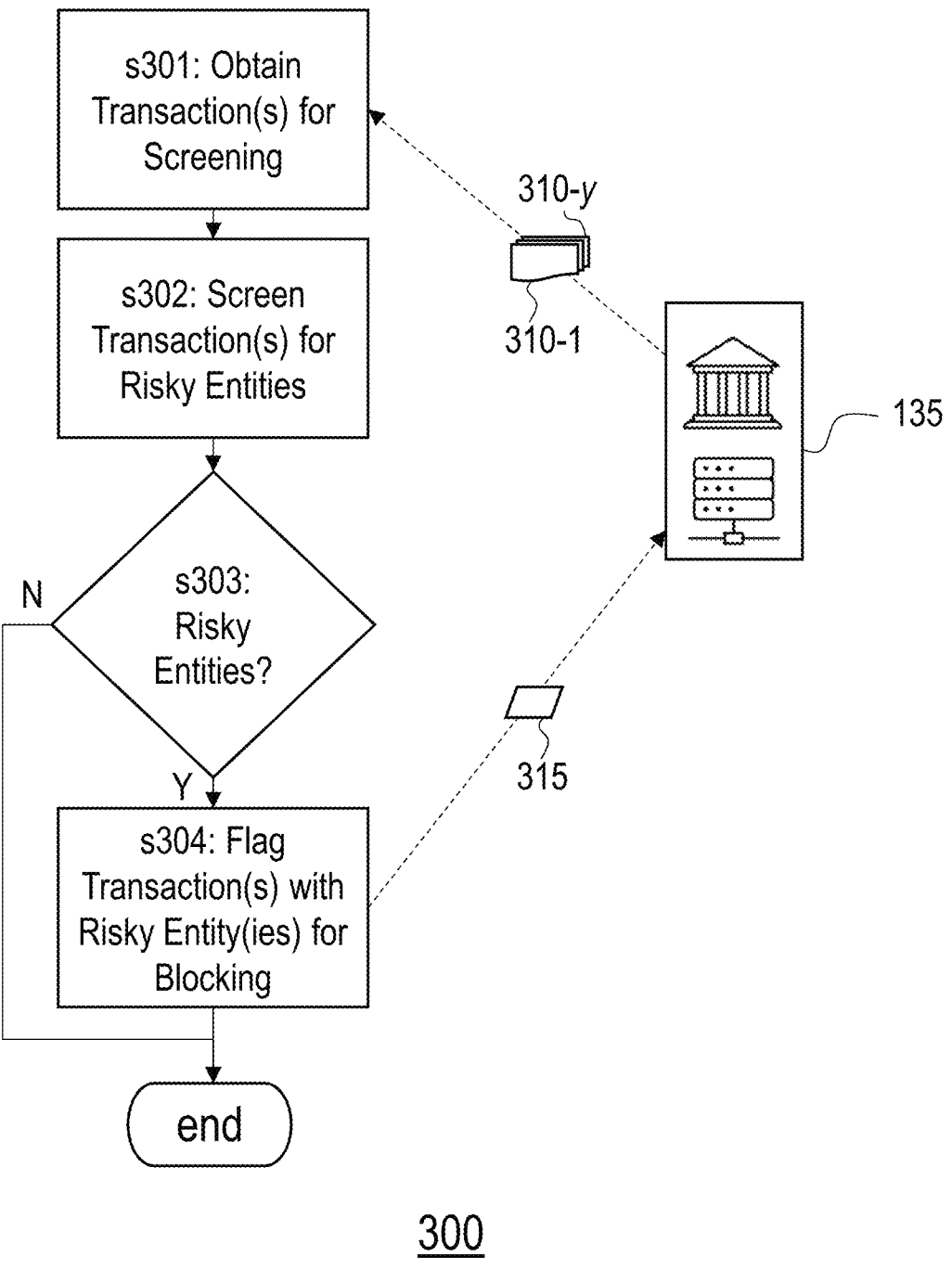
FIG. 3 is a flow diagram of a transaction screening process for the system of FIG. 1 in accordance with one or more exemplary implementations of the present disclosure.

Transaction processing management system 135, computing apparatus 101, and/or information system 120 assesses, or audits, new and ongoing (or pending) transactions using the real time cache that is maintained via process 200. FIG. 3 is a flow diagram of a transaction screening process 300 in accordance with one or more exemplary implementations of the present disclosure. In certain embodiments, process 300 can be executed for every initiated transaction and can also be executed at one or more progression milestones of each transaction, for example, by invoking the screening cache whenever a new transaction is generated.

As illustrated in FIG. 3, process 300 initiates with step s301, where transaction processing management system 135 (and/or computing apparatus 101 and/or information system 120) obtains one or more transactions 310-1 . . . 310-y (y≥1) for review. In some embodiments, computing apparatus 101 and/or information system 120 can execute process 300 and, accordingly, obtain pending transaction(s) 310 from transaction processing management system 135. In one or more exemplary implementations, process 300 is executed at transaction processing management system 135 (and/or computing apparatus 101 and/or information system 120) on a recurrent, or iterative, basis using, for example, an API for obtaining (or retrieving) the transaction(s) 310 and for referencing the real time cache, or repository, (not shown), which is maintained at one or more of computing apparatus 101, information system 120, and transaction processing management system 135. Step s301 and process 300 can be automatically triggered at transaction processing management system 135 (and/or computing apparatus 101 and/or information system 120), such as at an initiated transaction, a progression milestone, a final pre-execution audit, to name a few—for example, through a REST service, a Kafka event, or the like.

Next, at step s302, transaction processing management system 135 (and/or computing apparatus 101 and/or information system 120) screens the transaction(s) obtained at step s301 for the risky entity(es) identified and maintained at the real time cache (not shown) according to process 200.

In one or more exemplary implementations, the following parameters of each obtained transaction 310 are screened for a match or association with the risky entity(ies) maintained at the real time cache:

a. Payee Name
b. Payer Name
c. Payer Bank
d. Payee Bank e. Payer Country f. Payee Country In certain embodiments, the parameters are configurable and can be modified in real time.

Transaction processing management system 135 (and/or computing apparatus 101 and/or information system 120) then, at step s303, determines whether at least one of the parameters in the obtained transaction(s) 310 incorporates an indication of a risky entity maintained at the real time cache of process 200.

Upon determining that at least one of the parameters in the obtained transaction(s) 310 incorporates an indication of a risky entity ("Y"), transaction processing management system 135 (and/or computing apparatus 101 and/or information system 120) proceeds to step s304, where a fraud alert response 315 is issued upstream at (or transmitted to) transaction processing management system 135 to flag the transaction(s) 310 for blocking. In one or more exemplary implementations, fraud alert response 315 is issued in real time through a REST service, a Kafka event, or the like.

Upon determining that none of the parameters in the obtained transaction(s) 310 incorporate an indication of a risky entity ("N"), computing apparatus 101 (and/or information system 120) concludes process 300.

Figure 4:
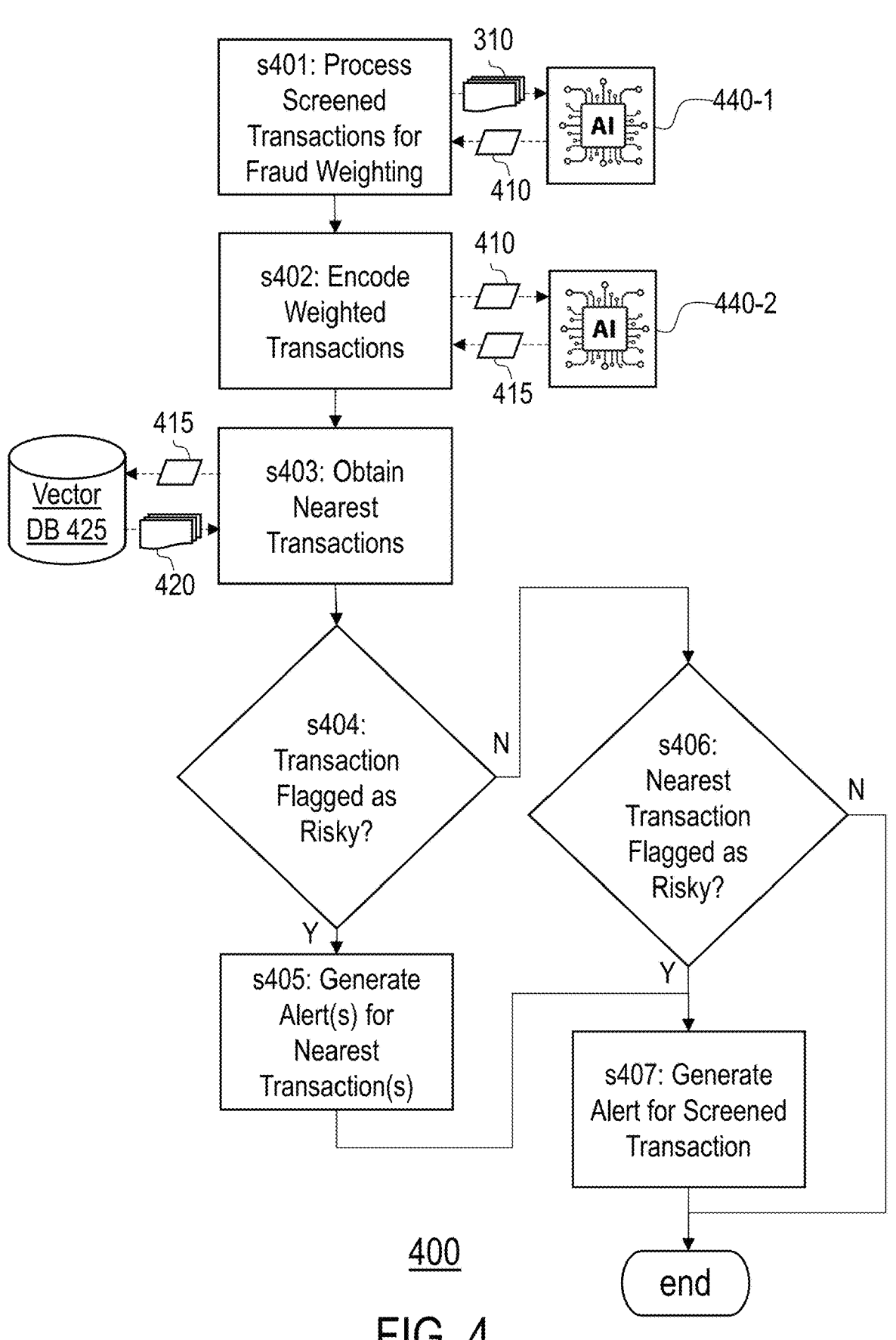
FIG. 4 is a flow diagram of a similar transaction screening process for the system of FIG. 1 according to one or more exemplary implementations of the present disclosure.

FIG. 4 is a flow diagram of a similar transaction screening process 400 according to one or more exemplary implementations of the present disclosure.

As illustrated in FIG. 4, process 400 initiates with step s401, where computing apparatus 101 (and/or information system 120) processes fraud weightings for the one or more transactions 310 that are screened at steps s302-s304 of process 300. The one or more transactions 310 can correspond to fraud alert response(s) 315 or not flagged for being associated with a risky entity in process 300. In one or more exemplary implementations, the fraud weightings relate to weighting assignments to parameters of the transactions for determining, or independently confirming, fraudulent transactions that are similar to those with risky entities identified via process 300. In embodiments, process 400 can be executed at computing apparatus 101 (and/or information system 120) on a recurrent, or iterative, basis in conjunction with process 300. In certain embodiments, step s401 and process 400 can also be part of process 300 and triggered upon screening the one or more transactions 310. In some embodiments, news item(s) 210 can be embodied in corresponding one or more notifications pushed from server 145.

As illustrated in FIG. 4, the transaction(s) 310 are processed using an AI processor 440-1. In one or more exemplary implementations, AI processor 440-1 is a transformer adapted to weight the respective fields of transaction(s) 310 based on relevance to fraud detection. In one or more exemplary implementations, the code for each transaction 310, for example, payment code in Javascript Object Notation (JSON), is transformed into a weighted string 410 for vector encoding. Weightings for the respective fields are determined based on recorded fraud trends over a period, for example, 1-6 months, or 2 months, prior to the processing. In some embodiments, the weight parameters are configurable for overriding potential manipulation, for example, by adding new parameters or changing weightage of existing parameters.

Next, at step s402, computing apparatus 101 (and/or information system 120) encodes the weighted string(s) 410 using an AI processor 440-2 into respective vector representations 415 using an encoder based AI processor 440-2 of AI processing system 140. In one or more exemplary implementations, each weighted string 410 is converted into a vector representation using encoder based AI processor 440-2. In certain embodiments, encoder based AI processor 440-2 can incorporate an encoder only model, such as BERT or the like, for capturing meaning of each weighted string 410 corresponding to each transaction 310.

At step s403, computing apparatus 101 (and/or information system 120) obtains one or more nearest neighbor transactions 420 from a database 425 maintained at computing apparatus 101 (and/or information system 120 and/or transaction processing management system 135). In one or more exemplary implementations, database 425 is a vector database (DB) having stored therein transactions in text chunks annotated with any identified risky entities for transactions that are flagged with such risky entities, for example, by manual annotation, prior processing and/or training using models 440, prior executions of process 300 and/or 400, to name a few. In certain embodiments, the vector DB 425 can provide an ANN search for obtaining nearest neighbor, or semantically matching, transaction(s) 420. The similarity method and distance can be configurable by, for example, restarting the custom component used for executing step s403.

In one or more exemplary implementations, computing apparatus 101 (and/or information system 120) also, at step s403, updates vector DB 425 based on transaction(s) 310 and/or vector representation(s) 415. Accordingly, vector DB 425 is maintained as an up-to-date repository of transactions for nearest neighbor determinations. In certain embodiments, the transactions maintained at database 425 can include pending and executed (or completed) transactions.

Next, at step s404, computing apparatus 101 (and/or information system 120) determines whether transaction(s) 310 is flagged as risky, for example, identified with one or more risky entities at steps s303 and s304 in process 300.

Upon determining that transaction(s) 310 is flagged as risky ("Y"), computing apparatus 101 (and/or information system 120) proceeds to step s406 and generates one or more alerts for nearest neighbor transactions 420. In embodiments, the alert(s), or alert message(s), can be incorporated in an email message, a push notification, an attachment, a file, or the like, to one or more computing devices for review by an operator and/or an automated process.

Upon determining that transaction(s) 310 is not flagged as risky ("N"), computing apparatus 101 (and/or information system 120) proceeds to step s406 and determines whether any of the nearest neighbor transactions 420 is flagged as risky, for example, identified with one or more risky entities at steps s303 and s304 in process 300.

Proceeding from step s405 of generating one or more alerts for nearest neighbor transactions 420 or upon determining, at step s406, that nearest neighbor transaction(s) 420 is flagged as risky ("Y"), process 400 concludes with step s407, where computing apparatus 101 (and/or information system 120) generates one or more alerts for screened transaction(s) 310. In embodiments, the alert(s), or alert message(s), can be incorporated in an email message, a push notification, an attachment, a file, or the like, to one or more computing devices, for example, computing apparatus 101, for review by an operator and/or an automated process. In some embodiments, alerts generated at steps s405 and s407 can be consolidated into alert messages for each transaction 310, groups of transactions, periodic communications, or the like.

EXAMPLES

The following Example 1 is the code for a sample transaction 310, including a plurality of fields, according to one or more example implementations of the present disclosure.

---

Example 1

---

```
payment = {
    "id": "3", (denotes a transaction identifier "id")
    "txn_amount": 100.00, (denotes a transaction amount "txn_amount")
    "bank_to": "Bank B", (denotes a transaction, or payment, destination
    institution "bank_to")
    "bank_from": "Bank A", (denotes a transaction, or payment, source
    institution "bank_from")
    "country_to": "France", (denotes a transaction, or payment, destination
    jurisdiction "country_to")
    "country_from": "India", (denotes a transaction, or payment, source
    jurisdiction "country_from")
    'payee_name": "Mary", (denotes a transaction, or payment, destination
    entity "payer_name")
    "payer_name": "John Doe", (denotes a transaction, or payment, source
    entity "payer_name")
    "instrument": "ACH", (denotes a transaction "instrument," e.g.,
    Automated Clearing House ("ACH"))
    "sessionid": "123e4567-e89b-12d3" (denotes a transaction session
    identifier "sessionid")
    }
```

---

The following Example 2 includes the weights for the fields in the code of the sample transaction 310 of Example 1 in correspondence with step s401 of process 400 according to one or more example implementations of the present disclosure.

---

Example 2

---

```
Configurable weights parameter:
weights = {
    "payer_name": 1.0,
    "payee_name": 20.0,
    "country_from": 10.0,
    "country_to": 1.0,
    "txn_amount": 1.0,
    "bank_from": 1.0,
    "bank_to": 1.0,
    "id": 0.0,
    "instrument" : 5.0,
    " sessionid" : 10.0
    }
```

---

The following Example 3 includes a sample vector representation 415 of the sample transaction 310 of Example 1 in correspondence with step s402 of process 400 according to one or more example implementations of the present disclosure.

Example 3

Generate Embeddings Using BERT:

[−5.47876894e−01 −1.33188337e−01 −1.84961006e−01 −1.23878419e−01 −2.16231614e−01 −2.04362333e−01 3.65949005e−01 7.81821728e−01 −4.61935550e−01 −6.73485771e−02 4.89209071e−02 −3.22971106e−01 −3.19305927e−01 3.57429028e−01 4.05872434e−01 −8.93564224e−02 −2.84445673e−01 3.57818156e−01 3.16530704e−01 −1.00866921e−01 −4.01276886e−01 −1.71498790e−01 −2.20365062e−01 −2.16933310e−01 9.44171175e−02 1.31372765e−01 1.60387587e−02 −3.91527563e−01 −7.80041963e−02 1.44347340e−01 4.08617198e−01 3.86472680e−02 −3.84105384e−01 −8.11626390e−03 7.35313356e−01 −4.13760394e−01]

Portions of the methods described herein can be performed by software or firmware in machine readable form on a tangible (e.g., non-transitory) storage medium. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

The headings used herein are for organizational purposes only and are not meant to be used to limit the scope of the description or the claims. As used throughout this application, the words "may" and "can" are used in a permissive sense (i.e., meaning having the potential to), rather than the mandatory sense (i.e., meaning must). To facilitate understanding, like reference numerals have been used, where possible, to designate like elements common to the figures. In certain instances, a letter or numeral suffix following a dash ( . . . -a or . . . -1) denotes a specific example of an element marked by a particular reference numeral (e.g., 210-*a* or 210-1). Description of elements with references to the base reference numerals (e.g., 210) also refer to all specific examples with such letter suffixes (e.g., 210-*a* or 210-1), and vice versa.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof, and are meant to encompass the items listed thereafter and equivalents thereof as well as additional items.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting.

While the disclosure has described several example implementations, it will be understood by those skilled in the art that various changes can be made, and equivalents can be substituted for elements thereof, without departing from the spirit and scope of the disclosure. In addition, many modifications will be appreciated by those skilled in the art to adapt a particular instrument, situation, or material to embodiments of the disclosure without departing from the essential scope thereof. Therefore, it is intended that the disclosure not be limited to the particular embodiments disclosed, or to the best mode contemplated for carrying out this disclosure, but that the disclosure will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope encompassed by the present disclosure, which is defined by the set of recitations in the following claims and by structures and functions or steps which are equivalent to these recitations.

What is claimed is:

1. A system, comprising:

a network interface;

a processor; and a memory operatively connected to the processor and having stored thereon machine-readable instructions that, when executed, cause the processor to:

obtain, from one or more servers via the network interface, one or more news items, wherein the one or more news items are received in real time or near real time from at least one or more news feeds or one or more social media platforms;

encode, using a first artificial intelligence (AI) processor, the one or more news items obtained from the one or more servers into corresponding one or more news item vector representations, wherein the first AI processor comprises at least one or more transformers, one or more encoder modules of bidirectional encoder representations from transformers, or one or more decoder modules of generative pre-trained transformers;

obtain, from one or more first databases, one or more nearest neighbor news items using the one or more news item vector representations, wherein the one or more first databases comprises a vector database for storing news items in text chunks annotated with identified risky entities;

query, via the network interface, a second AI processor for an identification of one or more risky entities using the one or more news items obtained from the one or more servers and the one or more nearest neighbor news items obtained from the vector database in one or more prompts to the second AI processor, wherein the second AI processor comprises at least a decoder module of a decoder-based AI processing system;

determine whether a response from the second AI processor comprises at least one risky entity;

in response to determining that the response from the second AI processor comprises at least one risky entity, update a real time cache by adding one or more indicators corresponding to the at least one risky entity comprised in the response to the real time cache, wherein the one or more indicators are configured to be associated with parameters of transactions to be screened using the real time cache;

obtain, via the network interface, a plurality of transactions from a transaction processing management system;

determine, using the real time cache, whether the plurality of transactions contain one or more parameters associated with the at least one risky entity indicator maintained at the real time cache;

in response to determining that at least one of the plurality of transactions contains at least one parameter associated with the at least one risky entity indicator maintained at the real time cache, issue a fraud alert response at the transaction processing management system for flagging the at least one transaction for association with the at least one risky entity indicator maintained at the real time cache;

obtain, from the transaction processing management system via the network interface, one or more pending transactions;

process, using a third AI processor, weightings for one or more parameters associated with the one or more pending transactions obtained from the transaction processing management system;

encode, using a fourth AI processor, the one or more pending transactions with the processed weightings into corresponding one or more transaction vector representations;

obtain, from one or more second databases, one or more nearest transactions using the one or more transaction vector representations;

determine whether the one or more pending transactions obtained from the transaction processing management system are flagged for association with the at least one risky entity indicator maintained at the real time cache;

in response to determining that the one or more pending transactions obtained from the transaction processing management system are flagged for association with the at least one risky entity indicator maintained at the real time cache, generate an alert for the one or more nearest transactions obtained from the one or more second databases;

in response to determining that the one or more pending transactions obtained from the transaction processing management system are not flagged for association with the at least one risky entity indicator maintained at the real time cache, determine whether the one or more nearest transactions obtained from the one or more second databases are associated with the at least one risky entity indicator maintained at the real time cache;

in response to determining that the one or more pending transactions obtained from the transaction processing management system or the one or more nearest transactions obtained from the one or more second databases are flagged for association with the at least one risky entity indicator maintained at the real time cache, generate an alert for the one or more pending transactions obtained from the transaction processing management system; and output the generated one or more alerts to one or more computing devices via the network interface.

2. The system of claim 1, wherein the determining of whether the plurality of transactions contains one or more parameters associated with the at least one risky entity indicator maintained at the real time cache is executed for the one or more pending transactions prior to the obtaining of the one or more pending transactions from the transaction processing management system.

3. The system of claim 1, wherein the first AI processor is an encoder based AI processor and the second AI processor is a decoder based AI processor.

4. The system of claim 1, wherein the weightings are processed based on fraud trends over a period prior to the processing of the weightings.

5. The system of claim 1, wherein the third AI processor is a transformer and the fourth AI processor is an encoder based AI processor.

6. The system of claim 1, wherein the one or more second databases comprise at least one vector database (DB) having stored therein transactions with annotations in connection with risky entities.

7. The system of claim 6, wherein the one or more nearest transactions are obtained from the one or more second databases using an approximate nearest neighbor (ANN) search using the one or more transaction vector representations.

8. The system of claim 1, wherein the one or more nearest neighbor news items are obtained from the one or more first databases using an approximate nearest neighbor (ANN) search based on the one or more news item vector representations.

9. A method, comprising:

obtaining, from one or more servers via the network interface, one or more news items, wherein the one or more news items are received in real time or near real time from at least one or more news feeds or one or more social media platforms;

encoding, using a first artificial intelligence (AI) processor, the one or more news items obtained from the one or more servers into corresponding one or more news item vector representations, wherein the first AI processor comprises at least one or more transformers, one or more encoder modules of bidirectional encoder representations from transformers, or one or more decoder modules of generative pre-trained transformers;

obtaining, from one or more first databases, one or more nearest neighbor news items using the one or more news item vector representations, wherein the one or more first databases comprises a vector database for storing news items in text chunks annotated with identified risky entities;

querying, via the network interface, a second AI processor for an identification of one or more risky entities using the one or more news items obtained from the one or more servers and the one or more nearest neighbor news items obtained from the vector database in one or more prompts to the second AI processor, wherein the second AI processor comprises at least a decoder module of a decoder-based AI processing system;

determining whether a response from the second AI processor comprises at least one risky entity;

in response to determining that the response from the second AI processor comprises at least one risky entity, updating a real time cache by adding one or more indicators corresponding to the at least one risky entity comprised in the response to the real time cache, wherein the one or more indicators are configured to be associated with parameters of transactions to be screened using the real time cache;

obtaining, via the network interface, a plurality of transactions from a transaction processing management system;

determining, using the real time cache, whether the plurality of transactions contain one or more parameters associated with the at least one risky entity indicator maintained at the real time cache;

in response to determining that at least one of the plurality of transactions contains at least one parameter associated with the at least one risky entity indicator maintained at the real time cache, issuing a fraud alert response at the transaction processing management system for flagging the at least one transaction for association with the at least one risky entity indicator maintained at the real time cache;

obtaining, at a computing apparatus from the transaction processing management system via a network interface, one or more pending transactions;

processing, using a third AI processor, weightings for one or more parameters associated with the one or more pending transactions obtained from the transaction processing management system;

encoding, using a fourth AI processor, the one or more pending transactions with the processed weightings into corresponding one or more transaction vector representations;

obtaining, from one or more second databases, one or more nearest transactions using the one or more transaction vector representations;

determining whether the one or more pending transactions obtained from the transaction processing management system are flagged for association with the at least one risky entity indicator maintained at the real time cache;

in response to determining that the one or more pending transactions obtained from the transaction processing management system are flagged for association with the at least one risky entity indicator maintained at the real time cache, generating an alert for the one or more nearest transactions obtained from the one or more second databases;

in response to determining that the one or more pending transactions obtained from the transaction processing management system are not flagged for association with the at least one risky entity indicator maintained at the real time cache, determining whether the one or more nearest transactions obtained from the one or more second databases are associated with the at least one risky entity indicator maintained at the real time cache;

in response to determining that the one or more pending transactions obtained from the transaction processing management system or the one or more nearest transactions obtained from the one or more second databases are flagged for association with the at least one risky entity indicator maintained at the real time cache, generating an alert for the one or more pending transactions obtained from the transaction processing management system; and outputting the generated one or more alerts to one or more computing devices via the network interface.

10. The method of claim 9, wherein the determining of whether the plurality of transactions contains one or more parameters associated with the at least one risky entity indicator maintained at the real time cache is executed for the one or more pending transactions prior to the obtaining of the one or more pending transactions from the transaction processing management system.

11. The method of claim 9, wherein the first AI processor is an encoder based AI processor and the second AI processor is a decoder based AI processor.

12. The method of claim 9, wherein the one or more nearest neighbor news items are obtained from the one or more first databases using an approximate nearest neighbor (ANN) search based on the one or more news item vector representations.

13. The method of claim 9, wherein the third AI processor is a transformer and the fourth AI processor is an encoder based AI processor.

14. The method of claim 9, wherein the one or more second databases comprise at least one vector database (DB) having stored therein transactions with annotations in connection with risky entities.

15. The method of claim 14, wherein the one or more nearest transactions are obtained from the one or more second databases using an approximate nearest neighbor (ANN) search based on the one or more transaction vector representations.

16. The method of claim 9, wherein the weightings are processed based on fraud trends over a period prior to the processing of the weightings.

\* \* \* \* \*